(12) United States Patent
Zhu et al.

(10) Patent No.: US 9,798,052 B2
(45) Date of Patent: Oct. 24, 2017

(54) HOLLOW-STRUCTURE METAL GRATING

(71) Applicants: Tsinghua University, Beijing (CN); HON HAI PRECISION INDUSTRY CO., LTD., New Taipei (TW)

(72) Inventors: Zhen-Dong Zhu, Beijing (CN); Qun-Qing Li, Beijing (CN); Ben-Feng Bai, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 547 days.

(21) Appl. No.: 14/262,811

(22) Filed: Apr. 28, 2014

(65) Prior Publication Data

US 2015/0085364 A1    Mar. 26, 2015

(30) Foreign Application Priority Data

Sep. 22, 2013   (CN) .......................... 2013 1 04299075

(51) Int. Cl.
*G02B 5/18* (2006.01)
(52) U.S. Cl.
CPC ......... *G02B 5/1809* (2013.01); *G02B 5/1857* (2013.01)
(58) Field of Classification Search
None
See application file for complete search history.

(56) References Cited

U.S. PATENT DOCUMENTS

| 2004/0263290 A1 | 12/2004 | Sherrer et al. |
| 2013/0015482 A1 | 1/2013 | Su |
| 2015/0198385 A1* | 7/2015 | Craig ........................ F28F 1/02 |
| | | 165/166 |

FOREIGN PATENT DOCUMENTS

| CN | 101424758 | 5/2009 |
| TW | 200941746 | 10/2009 |
| TW | 201304208 | 1/2013 |

OTHER PUBLICATIONS

Nakata et al., Nano-Sized Hollow Bump Array Generated by Single Femtosecond Laser Pulse, Japanese Journal of Applied Physics, vol. 42 (2003) Pt. 2, No. 12A.*

Che-Wei Hsu, Polarized White Light Emitting Diodes, National Taiwan University of science and technology, Dec. 31, 2012.

* cited by examiner

*Primary Examiner* — Adam Krupicka
(74) *Attorney, Agent, or Firm* — Steven Reiss

(57) ABSTRACT

A hollow-structure metal grating is provided. The hollow-structure metal grating includes a substrate, a number of connecting metal layers, and a number of hollow metal protrusions spaced and located on a surface of the substrate. A space is defined between each of the number of hollow metal protrusions and the substrate.

15 Claims, 6 Drawing Sheets

HOLLOW-STRUCTURE METAL GRATING

RELATED APPLICATIONS

This application claims all benefits accruing under 35 U.S.C. §119 from China Patent Application No. 201310429907.5 filed on Sep. 22, 2013 in the China Intellectual Property Office, the disclosure of which is incorporated herein by reference.

BACKGROUND

1. Technical Field

The disclosure relates to a hollow-structure metal grating.

2. Description of Related Art

A sub-wavelength grating is a common optical component in the semiconductor industry. The size of the sub-wavelength grating is similar to or less than the active wavelength of the sub-wavelength grating. It is difficult to make a quartz grating with high density, sub-wavelength, and mark-space ratio. The sub-wavelength grating may be made by electron beam lithography, focused ion beam lithography, deep-ultraviolet lithography, holographic lithography, and nanoimprint lithography.

Currently there is no grating with a hollow structure made of metal.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
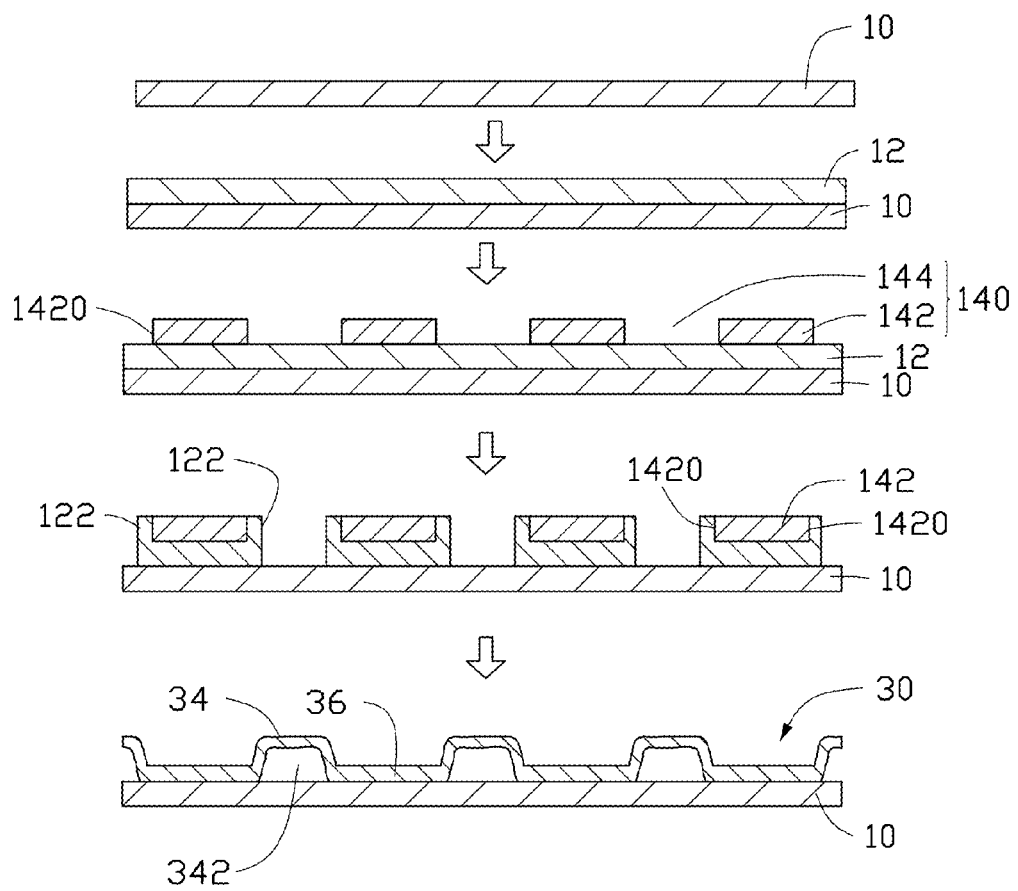
FIG. 1 is a schematic diagram showing one embodiment of a method of manufacturing a hollow-structure metal grating.

Referring to FIG. 1, one embodiment of a method of manufacturing a hollow-structure metal grating 30 comprises the following steps:

S10, providing a substrate 10;
S20, applying a metal layer 12 on a surface of the substrate 10;
S30, forming a patterned mask layer 140 on a surface of the metal layer 12, wherein the patterned mask layer 140 is made of a chemical amplified photoresist;
S40, plasma etching part of the surface of the metal layer 12 exposed out of the patterned mask layer 140; and
S50, dissolving the patterned mask layer 140 on the surface of the metal layer 12.

In step S10, the substrate 10 can be any shape such as a circular plate and a square plate. The substrate 10 can be a semiconductor substrate or a silicon substrate. The material of the substrate 10 can be gallium nitride (GaN), gallium arsenide (GaAs), sapphire, aluminum oxide, magnesium oxide, silicon, silica, silicon nitride, or silicon carbide. The silica can form a quartz substrate or a glass substrate. In one embodiment, the substrate 10 is a quartz substrate. The material of the substrate 10 can also be a P-type semiconductor or an N-type semiconductor, e.g. a P-type GaN or N-type GaN. Furthermore, the size, the thickness, and the shape of the substrate can be set as desired. The substrate 10 can be cleaned in a clean room.

In step S20, the metal layer 12 can be formed on the surface of the substrate 10 via electron beam evaporation or ion beam sputtering. The metal layer 12 can be made of gold, silver, copper, or aluminum. The thickness of the metal layer 12 should be greater than 10 nanometers to form a very sturdy self-supporting metal layer 12. The thickness of the metal layer 12 can be in a range from about 20 nanometers to about 200 nanometers. In one embodiment, the thickness of the metal layer 12 is about 100 nanometers.

In step S30, the patterned mask layer 140 can be made by a chemical amplified photoresist, and comprises a plurality of first protruding structures 142 and a plurality of first cavities 144 arranged in intervals. A part of the surface of the metal layer 12 can be exposed out of the patterned mask layer 140 through the first cavities 144. The patterned mask layer 140 can be a continuous pattern or a discontinuous pattern. In one embodiment, the plurality of first protruding structures 142 are strip structures oriented along a same direction, and the first cavities 144 are defined between adjacent protruding structures 142. In one embodiment, the plurality of first protruding structures 142 are square-shaped bars spaced with each other. A thickness of the plurality of first protruding structures 142 can be in a range from about 150 nanometers to about 420 nanometers. A width of the plurality of first protruding structures 142 can be in a range from about 20 nanometers to about 500 nanometers. A width of the first cavities 144 can be in a range from about 80 nanometers to about 500 nanometers.

The chemical amplified photoresist of the patterned mask layer 140 can be ZEP520 which is developed by Zeon Corp of Japan, PMMA (Polymethylmethacrylate), PS (Polystyrene), JEP-520, SAL601, or ARZ720. The chemical amplified photoresist can be expanded in the condition of being dissolved by organic solvent. In one embodiment, the chemical amplified photoresist of the patterned mask layer 140 is ZEP520, the first protruding structures 142 are strip structures, the first protruding structures 142 and the first cavities 144 are arranged with regular intervals, the width of each first protruding structure 142 is about 100 nm, and the depth of each cavity 144 is about 40 nm.

Figure 2:
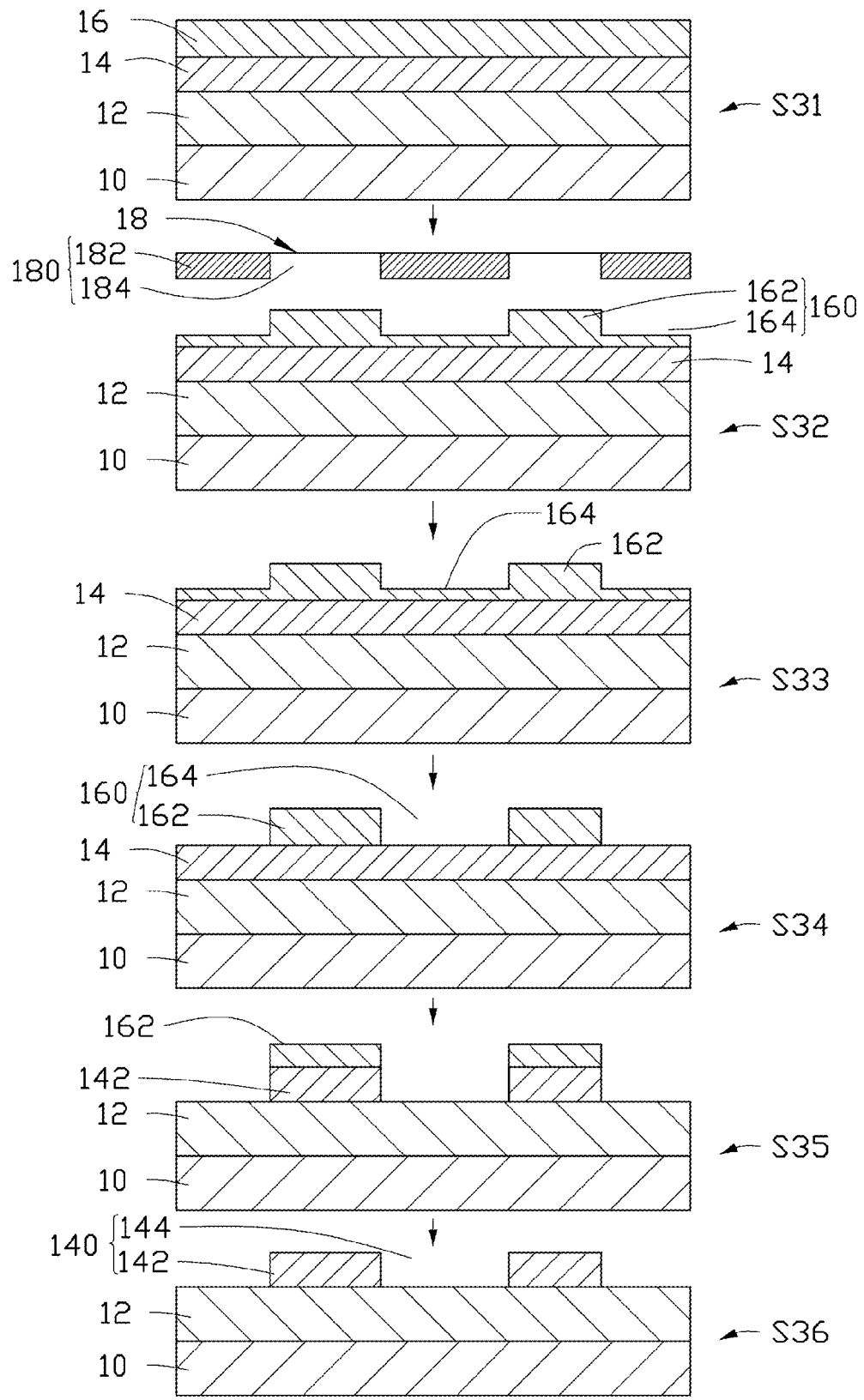
FIG. 2 is a schematic diagram showing the method for making a patterned mask layer used in the method of FIG. 1.

Referring to FIG. 2, the step S30 comprises the sub-steps of:

S31, forming a first resist layer 14 and then a second resist layer 16 on the surface of the metal layer 12;
S32, providing a master stamp 18 with a first nanopattern 180 defined therein;

S33, pressing the first nanopattern 180 of the master stamp 18 into the second resist layer 16 to form a second nanopattern 160;

S34, etching the second resist layer 16 to expose part of the first resist layer 14 out of the second nanopattern 160;

S35, etching the part of the first resist layer 14 exposed out of the second nanopattern 160 to expose part of the metal layer 12; and S36, removing a remaining material of the second resist layer 16 to obtain the patterned mask layer 140 on the surface of the metal layer 12.

In step S31, the first resist layer 14 is firstly formed on the surface of the metal layer 12, and the second resist layer 16 is formed on a surface of the first resist layer 14. The first resist layer 14 is sandwiched between the second resist layer 16 and the metal layer 12. The first resist layer 14 can be made of the same material as the patterned mask layer 140. In one embodiment, the first resist layer 14 is made of ZEP520 resist. The ZEP520 resist can be spin-coated on the surface of the metal layer 12 at a speed of about 500 rounds per minute to about 6000 rounds per minute, for about 0.5 minutes to about 1.5 minutes. Further, the ZEP520 resist coated on the surface of the metal layer 12 can be dried at a temperature of about 140 degrees centigrade to 180 degrees centigrade, for about 3 minutes to about 5 minutes. Thus, the first resist layer 14 is formed on the surface of the metal layer 12 located on the substrate 10. The thickness of the first resist layer 14 can be in a range of about 150 nanometers to about 420 nanometers.

In step S31, the second resist layer 16 can be a layer of hydrogen silsesquioxane (HSQ) or silicon on glass (SOG), which can be deposited on the first resist layer 14 through a bead coating method or a spin-coating method. In one embodiment, the HSQ can be spin-coated on the first resist layer 14 under high pressure at a speed of about 2500 rounds per minute to about 7000 rounds per minute, for about 0.5 minutes to about 2 minutes. The thickness of the second resist layer 16 can be in a range of about 100 nanometers to about 220 nanometers.

In step S32, the master stamp 18 can be made of rigid materials, such as nickel, silica, silicon, and carbon dioxide. The master stamp 18 can also be made of flexible materials, such as PET, PMMA, polystyrene (PS), and polydimethylsiloxane (PDMS). The master stamp 18 can be fabricated through an electron beam lithography method with the first nanopattern 180 formed therein. The first nanopattern 180 can be designed according to the actual application. In one embodiment shown in FIG. 2, the master stamp 18 is made of silica, and the first nanopattern 180 comprises a plurality of first ribs 182 and a plurality of first grooves 184.

In step S33, the master stamp 18 is first placed on the second resist layer 16 with the first nanopattern 180 contacting the second resist layer 16. The master stamp 18 is then pressed towards the second resist layer 16 at normal temperature. During this process, the first ribs 182 are pressed into the second resist layer 16, and some material of the second resist layer 16 are pressed into the first grooves 184. Finally, the master stamp 18 is removed from the second resist layer 16 with the first nanopattern 180 to form the second nanopattern 160 in the second resist layer 16. The second nanopattern 160 of the second resist layer 16 comprises a plurality of second ribs 162 and a plurality of second grooves 164. The second ribs 162 correspond to the first grooves 184. The second grooves 164 correspond to the first ribs 182.

In one embodiment, the master stamp 18 is pressed towards the second resist layer 16 at normal temperature in a vacuum environment of about $1 \times 10^{-1}$ millibars to about $1 \times 10^{-5}$ millibars. The pressure applied on the master stamp 18 is about 2 pounds per square foot to about 100 pounds per square foot. The pressure is applied on the master stamp 18 for about 2 minutes to about 30 minutes. After step S33, there may be remaining material of the second resist layer 16 at the bottom of the second grooves 164.

In step S34, the remaining material of the second resist layer 16 at the bottom of the second grooves 164 is removed by a plasma etching method, and part of the first resist layer 14 is exposed out of the second nanopattern 160 via the second grooves 164.

In one embodiment, a $CF_4$ reactive plasma etching method can be used to remove the remaining material of the second resist layer 16 at the bottom of the second grooves 164. For example, the second resist layer 16 with the second ribs 162 and the second grooves 164 formed therein can be placed in a $CF_4$ reactive plasma etching system. The $CF_4$ reactive plasma etching system generates $CF_4$ plasma, and the $CF_4$ plasma moves towards the second resist layer 16 to etch away the remaining material of the second resist layer 16 at the bottom of the second grooves 164, to expose part of the first resist layer 14 out of the second grooves 164.

The power of the $CF_4$ reactive plasma etching system can be in a range of about 10 watts to about 150 watts. The speed of the $CF_4$ plasma can be about 2 standard cubic centimeters per minute (sccm) to about 100 sccm. The partial pressure of the $CF_4$ plasma can be about 1 pascal (Pa) to about 15 Pa. The etching time can be about 2 seconds to about 4 minutes.

In step S35, part of the first resist layer 14 exposed by the second grooves 164 can be removed by oxygen plasma etching, and part of the first resist layer 14 covered by the second ribs 162 is protected by the second ribs 162 during the etching process. For example, the first resist layer 14 can be placed in an oxygen plasma etching system. The power of the oxygen plasma etching system can be in a range of about 10 watts to about 150 watts. The speed of the oxygen plasma can be about 2 sccm to about 100 sccm. The partial pressure of the oxygen plasma can be about 0.5 Pa to about 15 Pa. The etching time can be about 5 seconds to about 1 minute. During the process of etching the part of the first resist layer 14 exposed out of the second nanopattern 160, the part of the first resist layer 14 exposed out of the second grooves 164 is removed, and the plurality of first cavities 144 is obtained in the first resist layer 14. The part of the first resist layer 14 covered by the second ribs 162 is remained, and the plurality of first protruding structures 142 is obtained under the second ribs 162. Each of the plurality of first protruding structures 142 corresponds to one of the second ribs 162. The plurality of first cavities 144 and the plurality of first protruding structures 142 form the patterned mask layer 140.

In step S36, a remaining material of the second resist layer 16 (such as the second ribs 162) can be removed by a washing method via organic solvent. The organic solvent selected can only dissolve the material of the second resist layer 16, and the material of the first resist layer 16 is maintained. The patterned mask layer 140 would not be dissolved in the washing process, and is maintained. After step S36, the patterned mask layer 140 is obtained on the surface of the metal layer 12. Part of the metal layer 12 is exposed out of the patterned mask layer 140.

In step S40, the metal layer 12 covered with the patterned mask layer 140 can be set in an etching system, so that the part of the metal layer 12 exposed out of the patterned mask layer 140 can be removed by etching gas.

Referring to FIG. 1, each first protrusion 142 comprises sides 1420 protruded out of the surface of the metal layer 12, and are substantially perpendicular to the surface of the metal layer 12. During the plasma etching process, metal particles or metal powders are produced from the part of the metal layer 12 exposed out of the first cavities 144. The metal particles or the metal powders would deposit on the side 1420 of each first protrusion 142, and a sub-metal layer 122 can be formed on the side 1420 of each first protrusion 142 thereby. The sub-metal layer 122 can be perpendicular to the substrate 10, and the parts of the substrate 10 between the sub-metal layers 122 of adjacent first protruding structures 142 is exposed.

In step S40, the etching gas can be argon (Ar) or helium (He). The power of the gas etching system can be in a range of about 50 watts to about 150 watts. The speed of the etching gas can be about 20 sccm to about 80 sccm. The partial pressure of the etching gas can be about 10 Pa to about 50 Pa. The etching time can be about 5 seconds to about 4 minutes. In one embodiment, the metal layer 12 is made of gold, the etching gas is Ar, the speed of the Ar is about 48 sccm, the partial pressure of the Ar is about 26 Pa, the power of the gas etching system is about 70 watts, and the etching time is about 50 seconds.

In step S50, the patterned mask layer 140 is removed by dissolving in an organic solvent. The patterned mask layer 140 can be made of a chemical amplified photoresist. The chemical amplified photoresist would expand when being dissolved by organic solvent. The first protrusions 142 would expand and push the sub-metal layers 122 tipping upwards, the two sub-metal layers 122 between adjacent two first protrusions 142 would connect to each other, and a space would be defined between the connected two adjacent sub-metal layers 122 and the substrate 10.

Figure 3:
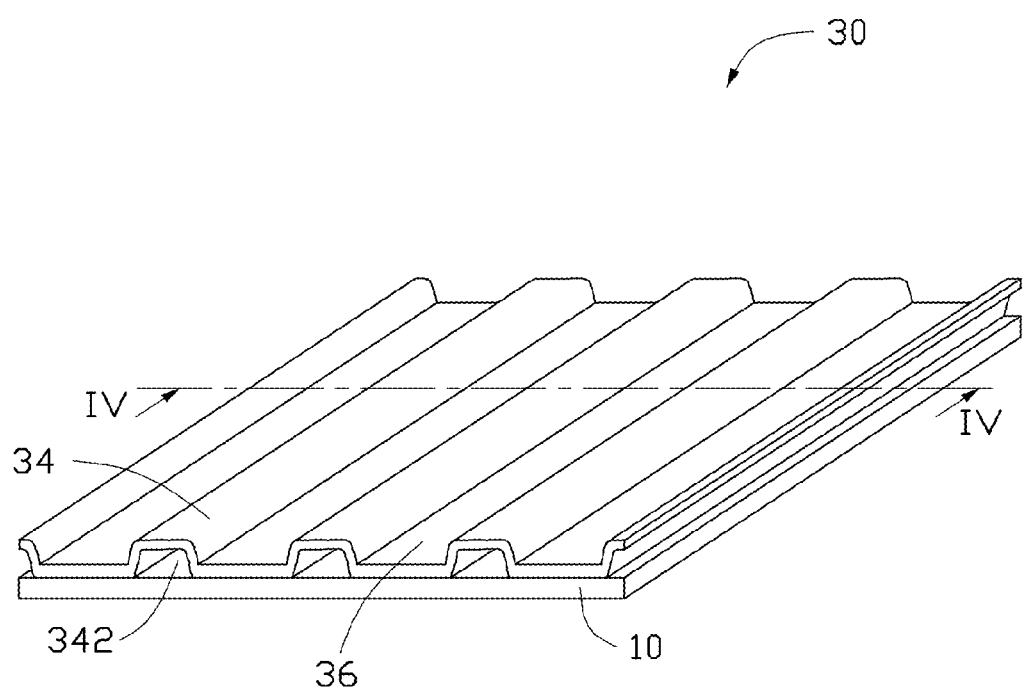
FIG. 3 is a schematic diagram showing the hollow-structure metal grating obtained by the method in FIG. 1.
Figure 4:
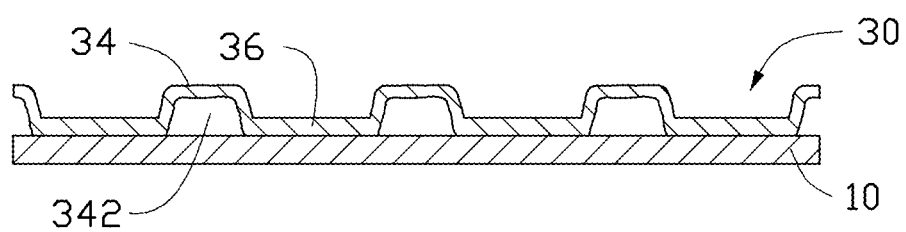
FIG. 4 is a cross-sectional diagram of the hollow-structure metal grating shown in FIG. 3.
Figure 5:
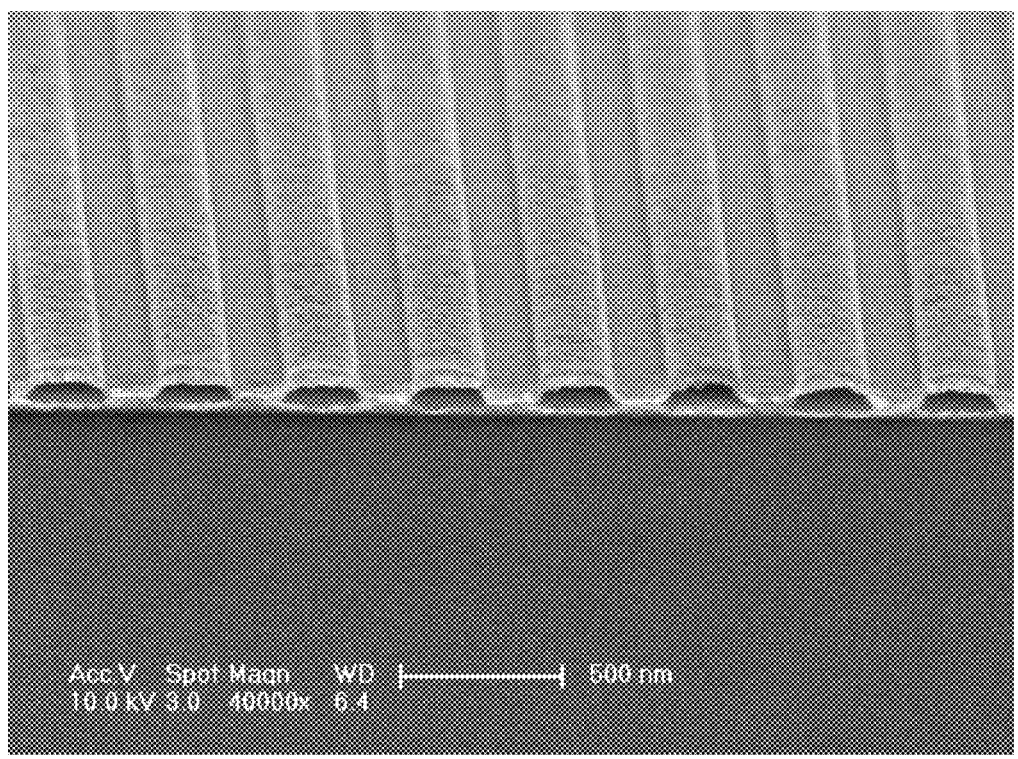
FIG. 5 is an image taken by a scanning electron microscope, of the hollow-structure metal grating by the method in FIG. 1.

Referring to FIGS. 3-5, the hollow-structure metal grating 30 comprises a substrate 10, a plurality of connecting metal layers 36, and a plurality of hollow metal protrusions 34 located on the substrate 10. The plurality of connecting metal layers 36 is attached on the substrate 10. Each of the connecting metal layers 36 connects adjacent hollow metal protrusions 34. Each two adjacent hollow metal protrusions 34 are connected to each other by one connecting metal layer 36. A space 342 is defined between each of the hollow metal protrusions 34 and the substrate 10.

The hollow metal protrusions 34 can be substantially equally spaced, and the metal connecting layers 36 can be substantially equally spaced. Each of the hollow metal protrusions 34 has the same size and shape. In addition, hollow metal protrusions 34 and the connecting metal layers 36 have the same extension direction. Each of the hollow metal protrusions 34 has opposite sidewalls, which are substantially perpendicular to the surface of the substrate 110. In addition, the hollow metal protrusions 34 and the connecting metal layers 36 are integrated to form a single solid structure. A width between the adjacent hollow metal protrusions 34 can be in a range from about 80 nanometers to about 500 nanometers. A width of the hollow metal protrusions 34 can be in a range from about 70 nanometers to about 400 nanometers. A thickness of the metal connecting layers 36 can be in a range from 20 nanometers to about 200 nanometers.

In one embodiment, the plurality of hollow metal protrusions 34 and the connecting metal layers 36 are strip shaped structures, and are arranged at regular intervals, the width of each hollow metal protrusion 34 is about 100 nm, and the height of the hollow metal protrusions 34 is about 40 nm.

Figure 6:
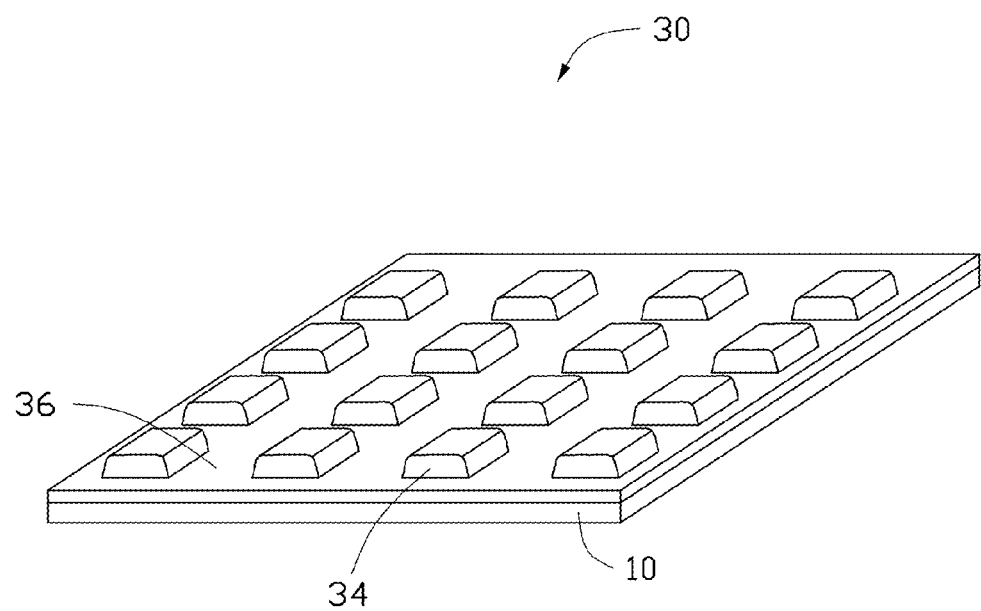
FIG. 6 is a schematic diagram showing a hollow-structure metal grating obtained by the method in FIG. 1 in one embodiment.

Referring to FIG. 6, in one embodiment, the hollow metal protrusions 34 are closed square shaped structures regularly dispersed. A space is defined in each of the hollow metal protrusions 34.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A metal grating comprising:
a hollow-structure metal grating, wherein the hollow-structure metal grating is a sub-wavelength grating, comprising:
a substrate;
a plurality of connecting metal layers and a plurality of hollow metal protrusions spaced and located on a surface of the substrate, wherein a space is defined between each of the plurality of hollow metal protrusions and the substrate, and each of the plurality of hollow metal protrusions has opposite sidewalls substantially perpendicular to the surface of the substrate.

2. The metal grating of claim 1, wherein each two adjacent hollow metal protrusions are connected to each other by one connecting metal layer.

3. The metal grating of claim 2, wherein the plurality of hollow metal protrusions and the plurality of connecting metal layers are integrated to form a single solid structure.

4. The metal grating of claim 3, wherein a width between the adjacent hollow metal protrusions is in a range from about 80 nanometers to about 500 nanometers.

5. The metal grating of claim 4, wherein a width of the plurality of hollow metal protrusions is in a range from about 70 nanometers to about 400 nanometers.

6. The metal grating of claim 4, wherein a thickness of the plurality of metal connecting layers is in a range from 20 nanometers to about 200 nanometers.

7. The metal grating of claim 1, wherein the plurality of connecting metal layers and the plurality of hollow metal protrusions are made of gold, silver, copper, or aluminum.

8. The metal grating of claim 1, wherein the plurality of hollow metal protrusions and the connecting metal layers are strip shaped structures, and are arranged at regular intervals.

9. The metal grating of claim 1, wherein the material of the substrate is gallium nitride (GaN), gallium arsenide (GaAs), sapphire, aluminum oxide, magnesium oxide, silicon, silica, silicon nitride, or silicon carbide.

10. A metal grating comprising:
a hollow-structure metal grating, wherein the hollow-structure metal grating is an optical component, comprising:
a substrate, wherein a material of the substrate is gallium nitride (GaN), gallium arsenide (GaAs), sapphire, aluminum oxide, magnesium oxide, silicon, silica, silicon nitride, or silicon carbide;
a plurality of hollow metal protrusions spaced from each other and located on a surface of the substrate, wherein a space is defined between each of the plurality of hollow metal protrusions and the substrate, each two adjacent hollow metal protrusions are connected with each other by a connecting metal layer located on the surface of the substrate, and each of the plurality of hollow metal protrusions has opposite sidewalls substantially perpendicular to the surface of the substrate.

11. The metal grating of claim 10, wherein each two adjacent hollow metal protrusions and the connecting metal layer are integrated to form a single solid structure.

12. The metal grating of claim 1, wherein the plurality of connecting metal layers and the plurality of hollow metal protrusions are made of gold, silver, copper, or aluminum.

13. The metal grating of claim 10, wherein the plurality of hollow metal protrusions and the connecting metal layers are strip shaped structures, and are arranged at regular intervals.

14. The metal grating of claim 10, wherein the plurality of hollow metal protrusions is closed square shaped structures regularly arranged.

15. The metal grating of claim 10, wherein a width between the adjacent hollow metal protrusions is in a range from about 80 nanometers to about 500 nanometers.

* * * * *